US012662496B2

(12) United States Patent
Zhou et al.

(10) Patent No.: US 12,662,496 B2
(45) Date of Patent: Jun. 23, 2026

(54) METHOD FOR PREPARING 4-(HYDROXYMETHYLPHOSPHINYL)-2-OXOBUTANOIC ACID

(71) Applicants: ZHEJIANG WYNCA CHEMICAL INDUSTRY GROUP CO., LTD, Zhejiang (CN); ZHEJIANG UNIVERSITY, Zhejiang (CN)

(72) Inventors: Shuguang Zhou, Hangzhou (CN); Lirong Yang, Hangzhou (CN); Long Qin, Hangzhou (CN); Haisheng Zhou, Hangzhou (CN); Shenluan Yu, Hangzhou (CN); Jianping Wu, Hangzhou (CN); Linlin Wang, Hangzhou (CN); Bo Zhan, Hangzhou (CN); Ping Wang, Hangzhou (CN)

(73) Assignees: ZHEJIANG WYNCA CHEMICAL INDUSTRY GROUP CO., LTD, Hangzhou (CN); ZHEJIANG UNIVERSITY, Hangzhou (CN)

( * ) Notice: Subject to any disclaimer, the term of this patent is extended or adjusted under 35 U.S.C. 154(b) by 485 days.

(21) Appl. No.: 18/556,894

(22) PCT Filed: Mar. 6, 2023

(86) PCT No.: PCT/CN2023/079816

§ 371 (c)(1),
(2) Date: Oct. 24, 2023

(87) PCT Pub. No.: WO2024/051121

PCT Pub. Date: Mar. 14, 2024

(65) Prior Publication Data

US 2025/0084109 A1 Mar. 13, 2025

(30) Foreign Application Priority Data

Sep. 8, 2022 (CN) ........................ 202211096537.3

(51) Int. Cl.
*C07F 9/30* (2006.01)

(52) U.S. Cl.
CPC .................................. *C07F 9/301* (2013.01)

(58) Field of Classification Search
CPC .................................. C07F 9/301; C07F 9/30
See application file for complete search history.

(56) References Cited

U.S. PATENT DOCUMENTS

| | | | |
|---|---|---|---|
| 4,399,287 | A | 8/1983 | Baillie et al. |
| 2010/0063313 | A1 | 3/2010 | Minowa et al. |
| 2017/0081349 | A1 | 3/2017 | Ressel et al. |

FOREIGN PATENT DOCUMENTS

| | | | |
|---|---|---|---|
| CN | 101641363 | A | 2/2010 |
| CN | 103665032 | A | 3/2014 |
| CN | 106459110 | A | 2/2017 |
| CN | 111004277 | A | 4/2020 |
| CN | 114085244 | A | 2/2022 |

OTHER PUBLICATIONS

International Search Report for PCT/CN2023/079816 mailed Apr. 23, 2023, ISA/CN.

Hans-Joachim Zeiss, Enantioselective synthesis of both enantiomers of phosphinothricin via asymmetric hydrogenation of alpha-acylamido acrylates, American Chemical Society, 1991, 56, p. 1783-1788.

*Primary Examiner* — Jafar F Parsa

(74) *Attorney, Agent, or Firm* — Yue (Robert) Xu; Apex Attorneys at Law, LLP

(57) ABSTRACT

The present invention provides a method for preparing 4-(hydroxymethylphosphinyl)-2-oxobutanoic acid, comprising the following steps: a) mixing acryloyl chloride, a first solvent, a polymerization inhibitor, a catalyst and potassium ferrocyanide, performing a substitution reaction, and performing distillation under reduced pressure to obtain an acryloyl cyanide intermediate; b) mixing the acryloyl cyanide intermediate obtained in step a) with hydrochloric acid and a polymerization inhibitor, performing a hydrolysis reaction, and then performing purification treatment to obtain crude 2-carbonyl-3-butenoic acid; c) mixing the crude 2-carbonyl-3-butenoic acid obtained in step b) with a second solvent and methyldichlorophosphine, and performing an addition reaction to obtain a solution containing diacyl chloride; d) mixing the solution containing diacyl chloride obtained in step c) with water, performing a hydrolysis reaction, and performing purification to obtain 4-(hydroxymethylphosphinyl)-2-oxobutanoic acid. The preparation method provided by the present invention has simple process, mild conditions, good controllability, low cost and high yield.

10 Claims, 2 Drawing Sheets

Signal: FID1A

| Retention time [min] | Type | Peak width[min] | Peak area | Height | Peak area% |
|---|---|---|---|---|---|
| 2. 628 | BV | 0. 26 | 772. 91 | 570. 16 | 2. 88 |
| 2. 876 | VB | 0. 15 | 8. 42 | 6. 26 | 0. 03 |
| 3. 057 | BB | 0. 13 | 15. 07 | 8. 98 | 0. 06 |
| 3. 406 | VV | 0. 41 | 26006. 86 | 7122. 45 | 96. 75 |
| 4. 316 | VV | 0. 28 | 13. 23 | 4. 06 | 0. 05 |
| 5. 532 | BV | 0. 41 | 63. 81 | 26. 12 | 0. 24 |
| | | Total | 26880. 29 | | |

METHOD FOR PREPARING 4-(HYDROXYMETHYLPHOSPHINYL)-2-OXOBUTANOIC ACID

CROSS REFERENCE TO RELATED APPLICATIONS

This application is the national phase of International Application No. PCT/CN2023/079816, titled "METHOD FOR PREPARING 4-(HYDROXYMETHYLPHOSPHINYL)-2-OXOBUTANOIC ACID", filed on Mar. 6, 2023, which claims the priority to Chinese Patent Application No. 202211096537.3, titled "METHOD FOR PREPARING 4-(HYDROXYMETHYLPHOSPHINYL)-2-OXOBUTANOIC ACID", filed on Sep. 8, 2022, with the China National Intellectual Property Administration, which are incorporated herein by reference in entirety.

FIELD

The present invention relates to the technical field of fine chemicals, in particular to a method for preparing a pesticide intermediate 4-(hydroxymethylphosphinyl)-2-oxobutanoic acid.

BACKGROUND 4-(Hydroxymethylphosphinyl)-2-oxobutanoic acid, abbreviated as PPO or ketoacid, is an important intermediate in the synthesis process of glufosinate-ammonium. This compound can be subjected to steps such as ammoniation reduction to obtain glufosinate-ammonium, which can be bio-enzymatically converted into L-glufosinate-ammonium.

In 1980, FBC Company first applied for the U.S. Pat. No. 4,399,287A for the preparation of ketoacid intermediate, wherein the carbon chain of 3-(ethoxymethylphosphinyl) propanoate is extended through Claisen condensation reaction to obtain a ketoacid intermediate 4-(hydroxymethylphosphinyl)-2-oxobutanoic acid, where the isolated yield of 4-(hydroxymethylphosphinyl)-2-oxobutanoic acid is about 30%.

In 1991, Hoechst Company reported the chemical synthesis of 4-(hydroxymethylphosphinyl)-2-oxobutanoic acid, wherein monoethyl methylphosphonite and ethyl acrylate are subjected to Michael addition reaction under the action of sodium ethoxide to obtain ethyl 3-(ethoxymethylphosphinyl) propanoate, which is then subjected to Claisen ester condensation reaction with diethyl oxalate under the action of sodium ethoxide at −50° C., and then hydrolysis and decarboxylation are performed with hydrochloric acid to prepare 4-(hydroxymethylphosphinyl)-2-oxobutanoic acid. However, the reaction in this method needs to be performed at −50° C., the overall yield is low, a large amount of waste water is generated, and the duration of the crystallization of the product is as long as 48 hours (J. Org. Chem., 1991, 56, 1783-1788). The reaction formula is as follows:

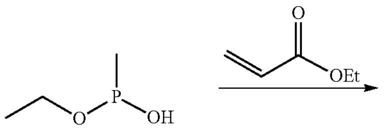

-continued

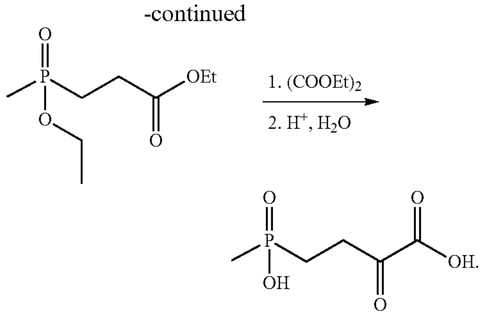

The Chinese patent with publication number CN103665032A discloses a method for preparing glufosinate-ammonium, comprising using five-membered heterocyclic phosphoric anhydride containing oxygen and phosphorus and cyanide as raw materials to perform cyanidation reaction in organic solvent to produce ketonitrile compound, which is then undergone hydrolysis in acidic solution to obtain ketoacid substance 4-(hydroxymethylphosphinyl)-2-oxobutanoic acid. The cyclic phosphoric anhydride used in this method is not easy to be prepared, high in cost and difficult to be purified.

Therefore, how to provide a method for preparing 4-(hydroxymethylphosphinyl)-2-oxobutanoic acid with high yield, simple purification and readily available raw materials has become a problem to be solved urgently.

SUMMARY

In view of this, an object of the present invention is to provide a method for preparing 4-(hydroxymethylphosphinyl)-2-oxobutanoic acid, which has simple process, mild condition, good controllability, low cost, and high yield.

The present invention provides a method for preparing 4-(hydroxymethylphosphinyl)-2-oxobutanoic acid, comprising the following steps:

a) mixing acryloyl chloride, a first solvent, a polymerization inhibitor, a catalyst and potassium ferrocyanide, performing a substitution reaction, and performing distillation under reduced pressure to obtain an acryloyl cyanide intermediate;

b) mixing the acryloyl cyanide intermediate obtained in step a) with hydrochloric acid and a polymerization inhibitor, performing a hydrolysis reaction, and then performing purification treatment to obtain crude 2-carbonyl-3-butenoic acid;

c) mixing the crude 2-carbonyl-3-butenoic acid obtained in step b) with a second solvent and methyldichlorophosphine, and performing an addition reaction to obtain a solution containing diacyl chloride;

d) mixing the solution containing diacyl chloride obtained in step c) with water, performing a hydrolysis reaction, and performing purification to obtain 4-(hydroxymethylphosphinyl)-2-oxobutanoic acid.

Preferably, in step a), the first solvent is selected from the group consisting of acetonitrile, ethyl acetate, tetrahydrofuran, phenylacetonitrile and a combination thereof.

Preferably, in step a), the polymerization inhibitor is selected from the group consisting of 4-methoxyphenol, butylated hydroxytoluene, mono tert-butyl hydroquinone, methyl hydroquinone and a combination thereof; wherein the polymerization inhibitor and acryloyl chloride are in a mass ratio of (0.001-0.05):1.

Preferably, in step a), the catalyst is cuprous cyanide; the catalyst, potassium ferrocyanide and acryloyl chloride are in a molar ratio of (0.01-0.1):(0.3-3):1.

Preferably, in step a), the substitution reaction is conducted at a temperature of 0° C.-100° C. for 0.5 h-48 h.

Preferably, in step a), the distillation under reduced pressure is conducted at a temperature of 10° C.-60° C.

Preferably, in step b), the hydrolysis reaction is conducted at a temperature of 50° C.-130° C. for 1 h-24 h.

Preferably, in step c), the second solvent is selected from the group consisting of dichloromethane, dichloroethane, chloroform, hexane, heptane, benzene, toluene, xylene and a combination thereof.

Preferably, in step c), the addition reaction is conducted at a temperature of 0° C.-100° C. for 1 h-24 h.

Preferably, in step d), the hydrolysis reaction is conducted at a temperature of 0° C.-100° C. for 0.1 h-24 h.

The present invention provides a method for preparing 4-(hydroxymethylphosphinyl)-2-oxobutanoic acid, comprising the following steps: a) mixing acryloyl chloride, a first solvent, a polymerization inhibitor, a catalyst and potassium ferrocyanide, performing a substitution reaction, and performing distillation under reduced pressure to obtain an acryloyl cyanide intermediate; b) mixing the acryloyl cyanide intermediate obtained in step a) with hydrochloric acid and a polymerization inhibitor, performing a hydrolysis reaction, and then performing purification treatment to obtain crude of 2-carbonyl-3-butenoic acid; c) mixing the crude 2-carbonyl-3-butenoic acid obtained in step b) with a second solvent and methyldichlorophosphine, and performing an addition reaction to obtain a solution containing diacyl chloride; d) mixing the solution containing diacyl chloride obtained in step c) with water, performing a hydrolysis reaction, and performing purification to obtain 4-(hydroxymethylphosphinyl)-2-oxobutanoic acid. Compared with the prior art, in the preparation method provided by the present invention, acryloyl chloride as a raw material, a polymerization inhibitor, and potassium ferrocyanide are subjected to a substitution reaction in the presence of a catalyst to obtain acryloyl cyanide, then the acryloyl cyanide is hydrolyzed under acidic conditions to obtain 2-carbonyl-3-butenoic acid, the 2-carbonyl-3-butenoic acid and methyldichlorophosphine are subjected to an addition reaction to obtain diacyl chloride, and the diacyl chloride is further hydrolyzed and purified to obtain the target product 4-(hydroxymethylphosphinyl)-2-oxobutanoic acid. This preparation method has simple process, mild conditions, good controllability, low cost and high yield.

DETAILED DESCRIPTION

Figure 1:
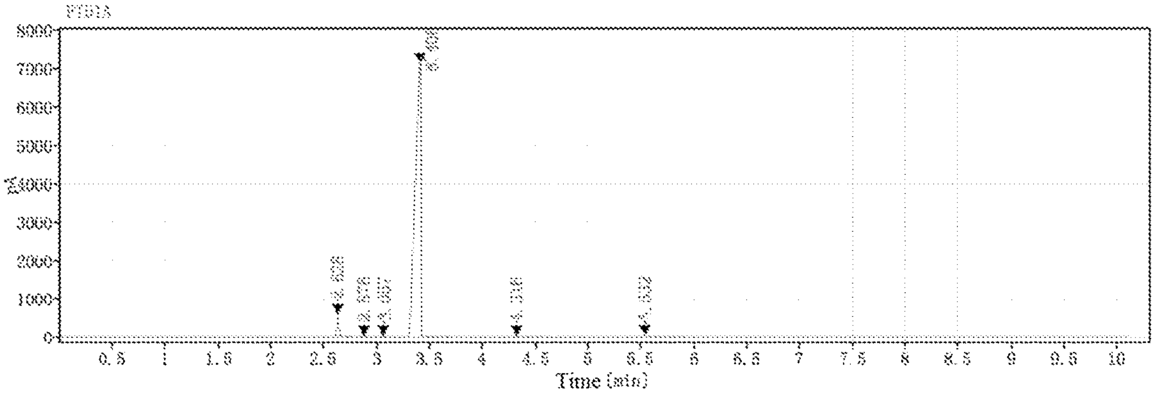
FIG. 1 is the GC spectrogram of acryloyl cyanide in Example 1 of the present invention.

The technical solutions of the present invention will be clearly and completely described below in conjunction with the examples of the present invention. Apparently, the described examples are only some of the embodiments of the present invention, not all of them. Based on the embodiments of the present invention, all other embodiments obtained by those of ordinary skill in the art without making creative efforts belong to the protection scope of the present invention.

The present invention provides a method for preparing 4-(hydroxymethylphosphinyl)-2-oxobutanoic acid, comprising the following steps:

a) mixing acryloyl chloride, a first solvent, a polymerization inhibitor, a catalyst and potassium ferrocyanide, performing a substitution reaction, and performing distillation under reduced pressure to obtain an acryloyl cyanide intermediate;

b) mixing the acryloyl cyanide intermediate obtained in step a) with hydrochloric acid and a polymerization inhibitor, performing a hydrolysis reaction, and then performing purification treatment to obtain crude 2-carbonyl-3-butenoic acid;

c) mixing the crude 2-carbonyl-3-butenoic acid obtained in step b) with a second solvent and methyldichlorophosphine, and performing an addition reaction to obtain a solution containing diacyl chloride;

d) mixing the solution containing diacyl chloride obtained in step c) with water, performing a hydrolysis reaction, and performing purification to obtain 4-(hydroxymethylphosphinyl)-2-oxobutanoic acid.

The present invention provides a method for preparing 4-(hydroxymethylphosphinyl)-2-oxobutanoic acid, wherein acryloyl chloride (represented by formula I below) as raw material, a small amount of polymerization inhibitor and potassium ferrocyanide are subjected to a substitution reaction in the presence of a catalyst to obtain acryloyl cyanide (represented by formula II below); then the acryloyl cyanide is hydrolyzed under acidic conditions to obtain 2-carbonyl-3-butenoic acid (represented by formula III below); the 2-carbonyl-3-butenoic acid and methyldichlorophosphine are subjected to addition reaction to obtain diacyl chloride (represented by formula IV below); the diacyl chloride is further hydrolyzed and purified to obtain the target product 4-(hydroxymethylphosphinyl)-2-oxobutanoic acid (represented by formula V below);

I

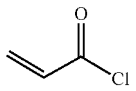

II

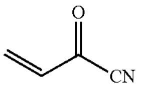

III

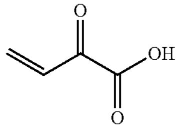

IV

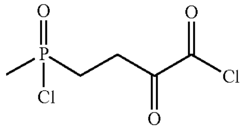

V

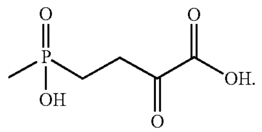

The reaction formula of the method for preparing 4-(hydroxymethylphosphinyl)-2-oxobutanoic acid provided by the present invention is as follows:

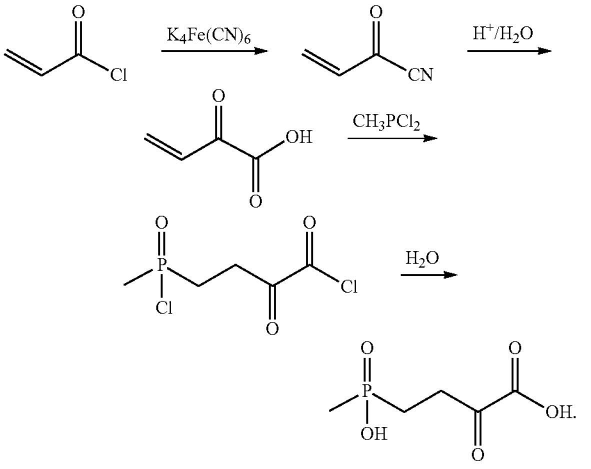

In the present invention, firstly, acryloyl chloride, a first solvent, a polymerization inhibitor, a catalyst and potassium ferrocyanide are mixed, a substitution reaction is carried out, and then distillation under reduced pressure is performed to obtain acryloyl cyanide intermediate. In the present invention, there is no special limitation on the sources of the acryloyl chloride and potassium ferrocyanide, and commercially available products well known to those skilled in the art can be used.

In the present invention, the first solvent is preferably selected from the group consisting of acetonitrile, ethyl acetate, tetrahydrofuran, phenylacetonitrile and a combination thereof, more preferably acetonitrile or ethyl acetate. In the present invention, there is no special limitation on the source of the first solvent, and commercially available products well known to those skilled in the art can be used.

In the present invention, the polymerization inhibitor is preferably selected from the group consisting of 4-methoxyphenol (MEHQ), butylated hydroxytoluene (BHT), mono tert-butyl hydroquinone (MTBHQ), methyl hydroquinone (THQ), and a combination thereof, more preferably 4-methoxyphenol (MEHQ). In the present invention, there is no special limitation on the source of the polymerization inhibitor, and commercially available products well known to those skilled in the art can be used.

In the present invention, the polymerization inhibitor and acryloyl chloride are in a mass ratio of preferably (0.001-0.05):1, more preferably (0.002-0.02):1.

In the present invention, the catalyst is preferably cuprous cyanide. In the present invention, there is no special limitation on the source of the catalyst, and commercially available products well known to those skilled in the art can be used.

In the present invention, the catalyst, potassium ferrocyanide and acryloyl chloride are in a molar ratio of preferably (0.01-0.1):(0.3-3):1, more preferably (0.02-0.05):(0.5-1.5):1.

In the present invention, the process of mixing acryloyl chloride, the first solvent, the polymerization inhibitor, the catalyst and potassium ferrocyanide is preferably specifically conducted by:

adding acryloyl chloride in the first solvent, and then adding the polymerization inhibitor, the catalyst and potassium ferrocyanide.

Afterwards, the mixture is heated to perform reaction for a period of time, and cooled down to obtain a material solution containing acryloyl cyanide, which is then subjected to distillation under reduced pressure and separation to obtain an acryloyl cyanide intermediate.

In the present invention, the substitution reaction is conducted at a temperature of preferably 0° C.-100° C., more preferably 50° C.-80° C., for preferably 0.5 h-48 h, more preferably 6 h-12 h.

In the present invention, the distillation under reduced pressure is conducted at a temperature of preferably 10° C.-60° C., more preferably 30° C.-50° C.

In the present invention, after the acryloyl cyanide intermediate is obtained, the obtained acryloyl cyanide intermediate is mixed with hydrochloric acid and the polymerization inhibitor to perform a hydrolysis reaction, and then purification treatment is performed to obtain crude 2-carbonyl-3-butenoic acid.

In the present invention, the hydrochloric acid has a mass concentration of preferably 20%-36%. The present invention has no special limitation on the source of the hydrochloric acid, and commercially available products well known to those skilled in the art can be used.

In the present invention, the hydrochloric acid and acryloyl cyanide are in a molar ratio of preferably (1-15):1, more preferably (2-5):1.

In the present invention, the polymerization inhibitor is preferably selected from the group consisting of 4-methoxyphenol (MEHQ), butylated hydroxytoluene (BHT), mono tert-butyl hydroquinone (MTBHQ), methyl hydroquinone (THQ), and a combination thereof, more preferably 4-methoxyphenol (MEHQ). In the present invention, there is no special limitation on the source of the polymerization inhibitor, and commercially available products well known to those skilled in the art can be used.

In the present invention, the polymerization inhibitor and acryloyl chloride are in a mass ratio of preferably (0.001-0.05):1, more preferably (0.005-0.02):1.

In the present invention, the process of mixing the obtained acryloyl cyanide intermediate with hydrochloric acid and the polymerization inhibitor is preferably specifically conducted by:

adding the acryloyl cyanide intermediate to a certain amount of hydrochloric acid, and then adding a small amount of polymerization inhibitor.

Afterwards, the mixture is heated to perform hydrolysis for a period of time, and then purified to obtain crude 2-carbonyl-3-butenoic acid.

In the present invention, the hydrolysis reaction is conducted at a temperature of preferably 50° C.-130° C., more preferably 80° C.-110° C., for preferably 1 h-24 h, more preferably 3 h-6 h.

In the present invention, the process of the purification treatment is preferably specifically conducted by:

after the hydrolysis reaction, continuing to remove acid water under reduced pressure to obtain a mixture containing 2-carbonyl-3-butenoic acid and ammonium chloride, then adding acetone for dissolution, filtering to remove insoluble salts, and subjecting the filtrate to distillation under reduced pressure to obtain crude 2-carbonyl-3-butenoic acid, which is directly used in the next reaction.

In the present invention, after obtaining the crude 2-carbonyl-3-butenoic acid, the obtained crude 2-carbonyl-3-butenoic acid is mixed with a second solvent and methyldichlorophosphine, and an addition reaction is performed to obtain a solution containing diacyl chloride.

In the present invention, the second solvent is preferably selected from the group consisting of dichloromethane, dichloroethane, chloroform, hexane, heptane, benzene, toluene, xylene and a combination thereof, more preferably dichloromethane, hexane or toluene. In the present invention, there is no special limitation on the source of the second solvent, and commercially available products well known to those skilled in the art can be used. In the present invention, the second solvent is preferably subjected to anhydrous treatment to obtain an solvent after anhydrous treatment.

In the present invention, there is no special limitation on the source of the methyldichlorophosphine, and commercially available products well known to those skilled in the art can be used.

In the present invention, the methyldichlorophosphine and acryloyl cyanide are in a molar ratio of preferably (0.95-1.2):1, more preferably (1-1.05):1.

In the present invention, the process of mixing the obtained crude 2-carbonyl-3-butenoic acid with the second solvent and methyldichlorophosphine is preferably specifically conducted by:

dispersing the obtained crude 2-carbonyl-3-butenoic acid in the second solvent, and slowly dropwise adding methyldichlorophosphine under nitrogen protection.

Afterwards, the mixture is maintained temperature and reacted for a certain period of time, and then cooled down to obtain a solution containing diacyl chloride.

In the present invention, the addition reaction is conducted at a temperature of preferably 0° C.-100° C., more preferably 30° C.-70° C., for preferably 1 h-24 h, more preferably 3 h-8 h.

In the present invention, after obtaining the solution containing diacyl chloride, the obtained solution containing diacyl chloride is mixed with water, and then hydrolyzed and purified to obtain 4-(hydroxymethylphosphinyl)-2-oxobutanoic acid.

In the present invention, the water and the second solvent are in a mass ratio of preferably (0.1-5):1, more preferably (0.5-2):1; and water is slowly added for reaction.

In the present invention, the hydrolysis reaction is conducted at a temperature of preferably 0° C.-100° C., more preferably 10° C.-40° C., for preferably 0.1 h-24 h, more preferably 0.5 h-3 h.

In the present invention, the purification process is preferably specifically conducted by:

after the hydrolysis reaction being completed, performing layer separation to remove the second solvent, and subjecting the aqueous layer to distillation under reduced pressure and separation to obtain the product 4-(hydroxymethylphosphinyl)-2-oxobutanoic acid.

The preparation method provided by the present invention has the following beneficial effects:

(1) Cheap acryloyl chloride is used as the raw material, the reaction conditions are mild, the operation is simple, the production cost is low, and it is easy to realize industrialization. (2) The final product 4-(hydroxymethylphosphinyl)-2-oxobutanoic acid is effectively prepared through simple process steps such as substitution, hydrolysis and addition under mild conditions.

The present invention provides a method for preparing 4-(hydroxymethylphosphinyl)-2-oxobutanoic acid, comprising the following steps: a) mixing acryloyl chloride, a first solvent, a polymerization inhibitor, a catalyst and potassium ferrocyanide, performing a substitution reaction, and performing distillation under reduced pressure to obtain an acryloyl cyanide intermediate; b) mixing the acryloyl cyanide intermediate obtained in step a) with hydrochloric acid and a polymerization inhibitor, performing a hydrolysis reaction, and then performing purification treatment to obtain crude 2-carbonyl-3-butenoic acid; c) mixing the crude 2-carbonyl-3-butenoic acid obtained in step b) with a second solvent and methyldichlorophosphine, and performing an addition reaction to obtain a solution containing diacyl chloride; d) mixing the solution containing diacyl chloride obtained in step c) with water, performing a hydrolysis reaction, and performing purification to obtain 4-(hydroxymethylphosphinyl)-2-oxobutanoic acid. Compared with the prior art, in the preparation method provided by the present invention, acryloyl chloride as a raw material, a polymerization inhibitor, and potassium ferrocyanide are subjected to a substitution reaction in the presence of a catalyst to obtain acryloyl cyanide, then the acryloyl cyanide is hydrolyzed under acidic conditions to obtain 2-carbonyl-3-butenoic acid, the 2-carbonyl-3-butenoic acid and methyldichlorophosphine are subjected to an addition reaction to obtain diacyl chloride, and the diacyl chloride is further hydrolyzed and purified to obtain the target product 4-(hydroxymethylphosphinyl)-2-oxobutanoic acid. This preparation method has simple process, mild conditions, good controllability, low cost and high yield.

In order to further illustrate the present invention, the present invention will be described in detail below in conjunction with the following examples. The raw materials used in the following examples of the present invention are all commercially available products.

Example 1

(1) 94.3 g of 96% acryloyl chloride and 300 mL of acetonitrile were added into a 1000 mL four-neck flask, and then added with 0.2 g of 4-methoxyphenol, 4.5 g of 99% cuprous cyanide and 376 g of potassium ferrocyanide. The mixture was heated up to 70-80° C., subjected to reflux reaction for 12 hours, and cooled down to obtain a material solution containing acryloyl cyanide. The material solution was subjected to distillation under reduced pressure at a temperature controlled at 40-50° C., and separated to obtain 71.2 g of 97% acryloyl cyanide intermediate (see FIG. 1 for the GC spectrum), with a yield of 85%.

(2) The acryloyl cyanide obtained above was added into a 500 mL four-neck flask filled with 210 g of 30% hydrochloric acid, and added with 0.2 g of 4-methoxyphenol. The mixture was heated up to 100-110° C. for hydrolysis reaction. After 3 hours, acid water was removed under reduced pressure to obtain a mixture containing 2-carbonyl-3-butenoic acid and ammonium chloride. 100 mL of acetone was added for dissolution. The mixture was filtered to remove insoluble salts. The filtrate was distilled under reduced pressure to obtain crude 2-carbonyl-3-butenoic acid.

(3) The crude 2-carbonyl-3-butenoic acid obtained above was dispersed in 200 g of dichloromethane after anhydrous treatment. 102 g of 97% methyldichlorophosphine was slowly added dropwise under the protection of nitrogen. The mixture was controlled at a temperature of 40-50° C. and maintained at this temperature for 5 hours of reaction, and then cooled to obtain a solution containing diacyl chloride.

Figure 2:
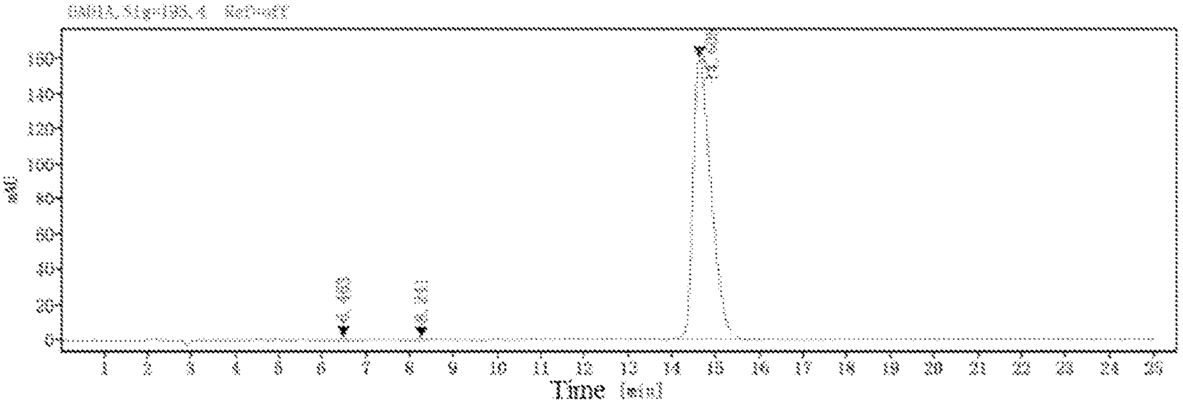
FIG. 2 is the HPLC spectrogram of the 4-(hydroxymethylphosphinyl)-2-oxobutanoic acid obtained in Example 1 of the present invention.
Figure 3:
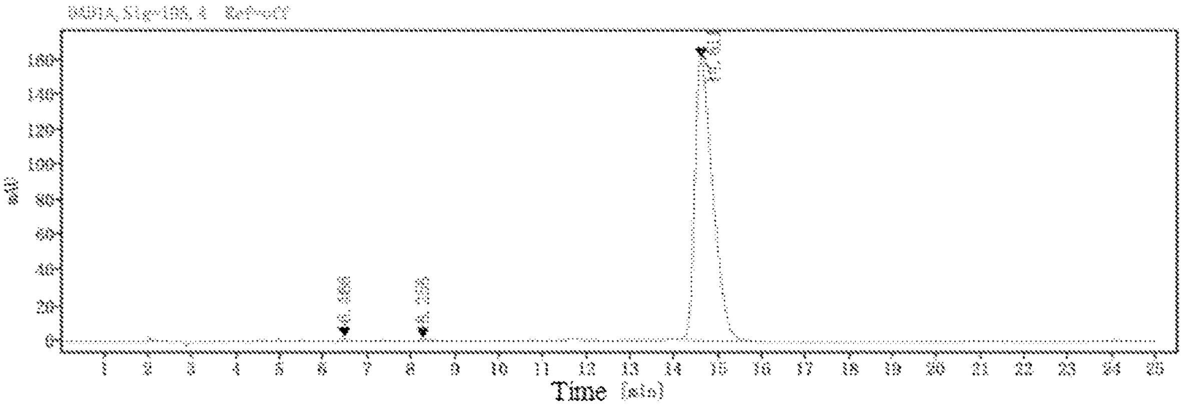
FIG. 3 is the HPLC spectrogram of 4-(hydroxymethylphosphinyl)-2-oxobutanoic acid standard sample.

(4) The above-obtained solution containing diacyl chloride was slowly added with 100 g of water. The mixture was controlled at a temperature of 20-30° C. for 1 hour of reaction. After the reaction was completed, layer separation was performed to remove the solvent. The aqueous layer was distilled under reduced pressure and separated to obtain 156.4 g of the product 4-(hydroxymethylphosphinyl)-2- oxobutanoic acid (see FIG. 2 for the HPLC spectrum, and FIG. 3 for the standard sample), with a purity of 92% and a yield of 94%.

Example 2

(1) 94.3 g of 96% acryloyl chloride and 300 mL of acetonitrile were added into a 1000 mL four-neck flask, and then added with 1.0 g of butylated hydroxytoluene, 1.8 g of 99% cuprous cyanide and 113 g of potassium ferrocyanide. The mixture was heated up to 50-60° C., maintained at this temperature for 6 hours of reaction, and cooled down to obtain a material solution containing acryloyl cyanide. The material solution was subjected to distillation under reduced pressure at a temperature controlled at 30-40° C., and separated to obtain 61.6 g of 96% acryloyl cyanide intermediate with a yield of 73%.

(2) The acryloyl cyanide obtained above was added into a 1000 mL four-neck flask filled with 440 g of 30% hydrochloric acid, and added with 0.2 g of 4-methoxyphenol. The mixture was heated up to 80-90° C. for hydrolysis reaction. After 6 hours, acid water was removed under reduced pressure to obtain a mixture containing 2-carbonyl-3-butenoic acid and ammonium chloride. 100 mL of acetone was added for dissolution. The mixture was filtered to remove insoluble salts. The filtrate was distilled under reduced pressure to obtain crude 2-carbonyl-3-butenoic acid.

(3) The crude 2-carbonyl-3-butenoic acid obtained above was dispersed in 200 g of dichloromethane after anhydrous treatment. 93 g of 97% methyldichlorophosphine was slowly added dropwise under the protection of nitrogen. The mixture was controlled at a temperature of 30-40° C. and maintained at this temperature for 8 hours of reaction, and then cooled to obtain a solution containing diacyl chloride.

(4) The above-obtained solution containing diacyl chloride was slowly added with 200 g of water. The mixture was controlled at a temperature of 10-20° C. for 3 hour of reaction. After the reaction was completed, layer separation was performed to remove the solvent. The aqueous layer was distilled under reduced pressure and separated to obtain 132.9 g of the product 4-(hydroxymethylphosphinyl)-2-oxobutanoic acid with a purity of 91% and a yield of 92%.

Example 3

(1) 94.3 g of 96% acryloyl chloride and 300 mL of acetonitrile were added into a 1000 mL four-neck flask, and then added with 1.0 g of methyl hydroquinone, 4.5 g of 99% cuprous cyanide and 188 g of potassium ferrocyanide. The mixture was heated up to 70-80° C., subjected to reflux reaction for 10 hours, and cooled down to obtain a material solution containing acryloyl cyanide. The material solution was subjected to distillation under reduced pressure at a temperature controlled at 40-50° C., and separated to obtain 68.1 g of 94% acryloyl cyanide intermediate with a yield of 79%.

(2) The acryloyl cyanide obtained above was added into a 500 mL four-neck flask filled with 290 g of 20% hydrochloric acid, and added with 0.2 g of 4-methoxyphenol. The mixture was heated up to 90-100° C. for hydrolysis reaction. After 5 hours, acid water was removed under reduced pressure to obtain a mixture containing 2-carbonyl-3-butenoic acid and ammonium chloride. 100 mL of acetone was added for dissolution. The mixture was filtered to remove insoluble salts. The filtrate was distilled under reduced pressure to obtain crude 2-carbonyl-3-butenoic acid.

(3) The crude 2-carbonyl-3-butenoic acid obtained above was dispersed in 150 g of dichloromethane after anhydrous treatment. 95 g of 97% methyldichlorophosphine was slowly added dropwise under the protection of nitrogen. The mixture was controlled at a temperature of 60-70° C. and maintained at this temperature for 3 hours of reaction, and then cooled to obtain a solution containing diacyl chloride.

(4) The above-obtained solution containing diacyl chloride was slowly added with 300 g of water. The mixture was controlled at a temperature of 30-40° C. for 0.5 hour of reaction. After the reaction was completed, layer separation was performed to remove the solvent. The aqueous layer was distilled under reduced pressure and separated to obtain 143.9 g of the product 4-(hydroxymethylphosphinyl)-2-oxobutanoic acid with a purity of 90% and a yield of 91%.

Example 4

(1) 94.3 g of 96% acryloyl chloride and 250 mL of acetonitrile were added into a 1000 mL four-neck flask, and then added with 0.2 g of 4-methoxyphenol, 4.5 g of 99% cuprous cyanide and 188 g of potassium ferrocyanide. The mixture was heated up to 70-80° C., subjected to reflux reaction for 10 hours, and cooled down to obtain a material solution containing acryloyl cyanide. The material solution was subjected to distillation under reduced pressure at a temperature controlled at 40-50° C., and separated to obtain 68.4 g of 96% acryloyl cyanide intermediate with a yield of 81%.

(2) The acryloyl cyanide obtained above was added into a 500 mL four-neck flask filled with 295 g of 30% hydrochloric acid, and added with 0.2 g of 4-methoxyphenol. The mixture was heated up to 100-110° C. for hydrolysis reaction. After 3 hours, acid water was removed under reduced pressure to obtain a mixture containing 2-carbonyl-3-butenoic acid and ammonium chloride. 100 mL of acetone was added for dissolution. The mixture was filtered to remove insoluble salts. The filtrate was distilled under reduced pressure to obtain crude 2-carbonyl-3-butenoic acid.

(3) The crude 2-carbonyl-3-butenoic acid obtained above was dispersed in 200 g of dichloromethane after anhydrous treatment. 100 g of 97% methyldichlorophosphine was slowly added dropwise under the protection of nitrogen. The mixture was controlled at a temperature of 40-50° C. and maintained at this temperature for 5 hours of reaction, and then cooled to obtain a solution containing diacyl chloride.

(4) The above-obtained solution containing diacyl chloride was slowly added with 100 g of water. The mixture was controlled at a temperature of 20-30° C. for 2 hour of reaction. After the reaction was completed, layer separation was performed to remove the solvent. The aqueous layer was distilled under reduced pressure and separated to obtain 150.7 g of the product 4-(hydroxymethylphosphinyl)-2-oxobutanoic acid with a purity of 90% and a yield of 93%.

Example 5

This example was performed according to the preparation method provided in Example 1 except that no polymerization inhibitor 4-methoxyphenol was added in the substitution reaction stage, and the solvent in the addition reaction stage was hexane (replacing dichloromethane). Other steps were the same as in Example 1. 49.5 g of 95% acryloyl cyanide intermediate with a yield of 58% was obtained. 103.3 g of the product 4-(hydroxymethylphosphinyl)-2-oxobutanoic acid with a purity of 88% and a yield of 87% was obtained.

Example 6

This example was performed according to the preparation method provided in Example 1 except that the solvent in the substitution reaction stage was ethyl acetate (replacing acetonitrile), and the solvent in the addition reaction stage was toluene (replacing dichloromethane). Other steps were the same as in Example 1. 68.3 g of 95% acryloyl cyanide intermediate with a yield of 80% was obtained. 142.5 g of the product 4-(hydroxymethylphosphinyl)-2-oxobutanoic acid with a purity of 89% and a yield of 88% was obtained.

The above are only preferred embodiments of the present invention. It should be noted that, for those of ordinary skill in the art, without departing from the principle of the present invention, several improvements and modifications can also be made, and these improvements and modifications should also be regarded as the protection scope of the present invention.

The invention claimed is:

1. A method for preparing 4-(hydroxymethylphosphinyl)-2-oxobutanoic acid, comprising the following steps:

a) mixing acryloyl chloride, a first solvent, a polymerization inhibitor, a catalyst and potassium ferrocyanide, performing a substitution reaction, and performing distillation under reduced pressure to obtain an acryloyl cyanide intermediate;

b) mixing the acryloyl cyanide intermediate obtained in step a) with hydrochloric acid and a polymerization inhibitor, performing a hydrolysis reaction, and then performing purification treatment to obtain crude 2-carbonyl-3-butenoic acid;

c) mixing the crude 2-carbonyl-3-butenoic acid obtained in step b) with a second solvent and methyldichlorophosphine, and performing an addition reaction to obtain a solution containing diacyl chloride;

d) mixing the solution containing diacyl chloride obtained in step c) with water, performing hydrolysis a reaction, and performing purification to obtain 4-(hydroxymethylphosphinyl)-2-oxobutanoic acid.

2. The method according to claim 1, wherein in step a), the first solvent is selected from the group consisting of acetonitrile, ethyl acetate, tetrahydrofuran, phenylacetonitrile and a combination thereof.

3. The method according to claim 1, wherein in step a), the polymerization inhibitor is selected from the group consisting of 4-methoxyphenol, butylated hydroxytoluene, mono tert-butyl hydroquinone, methyl hydroquinone and a combination thereof; wherein the polymerization inhibitor and acryloyl chloride are in a mass ratio of (0.001-0.05):1.

4. The method according to claim 1, wherein in step a), the catalyst is cuprous cyanide; the catalyst, potassium ferrocyanide and acryloyl chloride are in a molar ratio of (0.01-0.1):(0.3-3):1.

5. The method according to claim 1, wherein in step a), the substitution reaction is conducted at a temperature of 0° C.-100° C. for 0.5 h-48 h.

6. The method according to claim 1, wherein in step a), the distillation under reduced pressure is conducted at a temperature of 10° C.-60° C.

7. The method according to claim 1, wherein in step b), the hydrolysis reaction is conducted at a temperature of 50° C.-130° C. for 1 h-24 h.

8. The method according to claim 1, wherein in step c), the second solvent is selected from the group consisting of dichloromethane, dichloroethane, chloroform, hexane, heptane, benzene, toluene, xylene and a combination thereof.

9. The method according to claim 1, wherein in step c), the addition reaction is conducted at a temperature of 0° C.-100° C. for 1 h-24 h.

10. The method according to claim 1, wherein in step d), the hydrolysis reaction is conducted at a temperature of 0° C.-100° C. for 0.1 h-24 h.

* * * * *